R. E. H. POMEROY.
PULVERIZING MATERIAL.
APPLICATION FILED JAN. 16, 1922.

1,431,252.

Patented Oct. 10, 1922.
10 SHEETS—SHEET 1.

INVENTOR
Ralph E. H. Pomeroy
by Dennis S. Wolcott
ATTORNEY

R. E. H. POMEROY.
PULVERIZING MATERIAL.
APPLICATION FILED JAN. 16, 1922.

1,431,252.

Patented Oct. 10, 1922.
10 SHEETS—SHEET 2.

INVENTOR
Ralph E. H. Pomeroy
by Damon S. Wolcott
ATTORNE

R. E. H. POMEROY.
PULVERIZING MATERIAL.
APPLICATION FILED JAN. 16, 1922.

1,431,252.

Patented Oct. 10, 1922.
10 SHEETS—SHEET 5.

INVENTOR
Ralph E. H. Pomeroy
by Dennis S. Wolcott
ATTORNEY

R. E. H. POMEROY.
PULVERIZING MATERIAL.
APPLICATION FILED JAN. 16, 1922.

1,431,252.

Patented Oct. 10, 1922.
10 SHEETS—SHEET 7.

INVENTOR
Ralph E. H. Pomeroy
by Damon D. Wolcott
ATTORNEY

R. E. H. POMEROY.
PULVERIZING MATERIAL.
APPLICATION FILED JAN. 16, 1922.

1,431,252.

Patented Oct. 10, 1922.
10 SHEETS—SHEET 10.

INVENTOR
Ralph E. H. Pomeroy
by Darwin S. Wolcott
ATTORNEY

Patented Oct. 10, 1922.

1,431,252

UNITED STATES PATENT OFFICE.

RALPH E. H. POMEROY, OF CANTON, OHIO.

PULVERIZING MATERIAL.

Application filed January 16, 1922. Serial No. 529,432.

*To all whom it may concern:*

Be it known that I, RALPH E. H. POMEROY, residing at Canton, in the county of Stark and State of Ohio, a citizen of the United States, have invented or discovered certain new and useful Improvements in Pulverizing Materials, of which improvement the following is a specification.

The invention described herein relates to improvements in pulverizing materials such as coal for fuel, and has for its object the removal of the pulverized material from one mill or pulverizing mechanism to another, and the final discharge to the point of use or storage by means of currents of air passing through the charge in the respective mills or pulverizers, the fineness of particles removed from the respective mills being determinable by the rate of flow of the air currents. The invention is hereinafter more fully described and claimed.

In the accompanying drawings forming a part of this specification.

Broadly considered my invention consists in effecting reduction of material in one chamber, removing the more or less completely reduced material to another chamber for further reduction, the transfer of the material from one chamber to another being effected by currents of air which in each chamber pass through the charge, i. e., balls and material to be ground, or a portion thereof. It is preferred that the several chambers in which reduction is effected should be closely adjacent to and preferably in the same drum.

In the construction shown herein the rotating drum consists of a stationary casing 4 enclosing a shell 5 having perforations which communicate with passages 17 formed in liners 18 which may extend longitudinally of the shell as shown and described in applications Serial Nos. 393147 and 474079, filed by me June 30, 1920, and June 1, 1921, respectively. The shell is provided with trunnions 7, one of which is made hollow for the introduction of the material to be reduced into the chamber wherein initial reduction is effected. The trunnions are mounted in fixed bearings 8 and the shell is driven in any suitable manner, as for example, by a pinion 9 engaging peripherally arranged teeth 10. When employing a single pulverizing unit, the casing 12 and shell 5 should be made of a length proportional to the number and length of chambers desired and divide the same longitudinally by one or more diaphragms.

Figure 1:
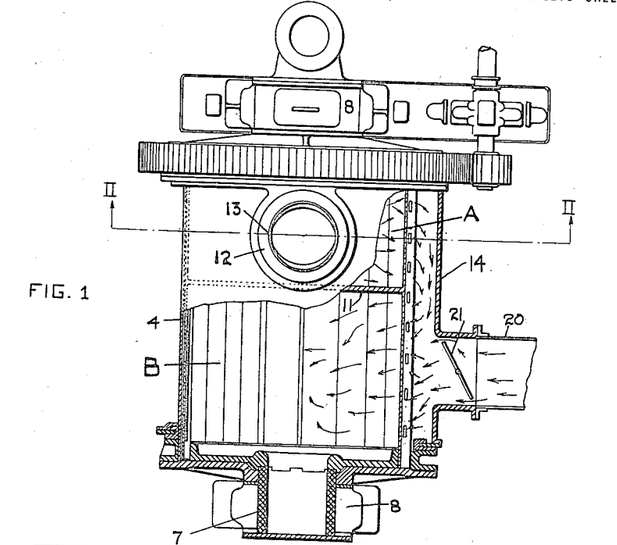
Fig. 1 is a view partly in plan and partly in section of a pulverizing mill of the drum-and-ball type embodying the improvements claimed herein.
Figure 2:
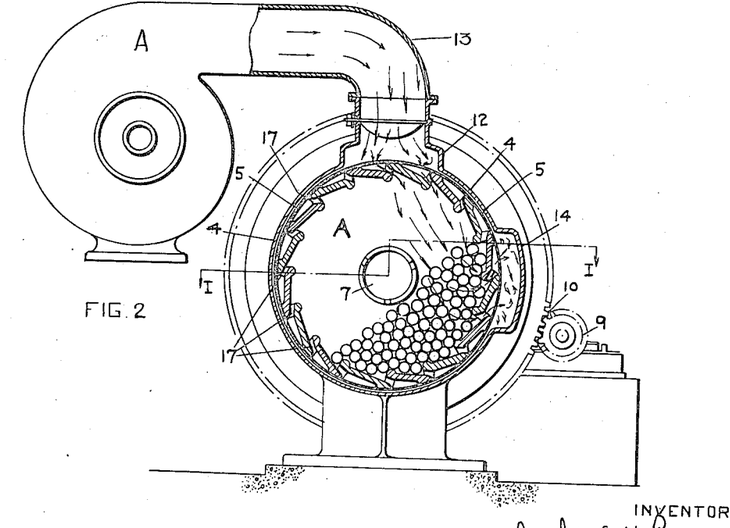
Fig. 2 is a sectional elevation, the plane of section being indicated by the line II—II, Fig. 1.
Figure 3:
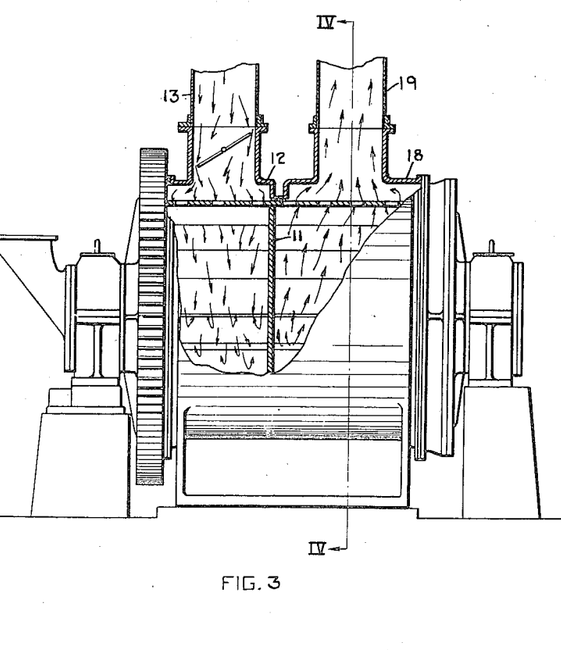
Fig. 3 is a view partly in side elevation and partly in section of the construction shown in Fig. 1.
Figure 4:
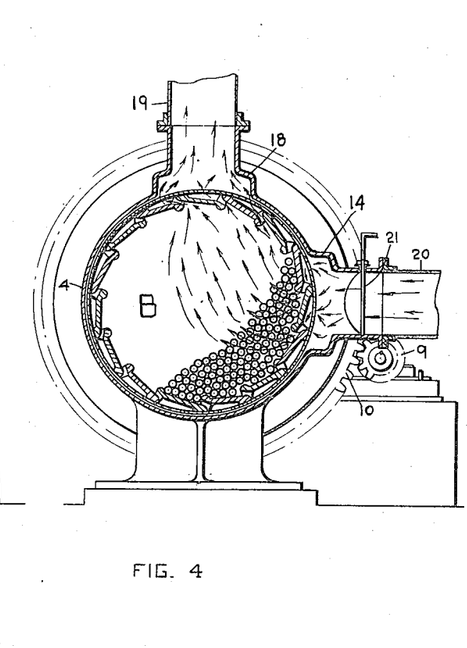
Fig. 4 is a sectional elevation on a plane indicated by the line IV—IV, Fig. 3.

In order to introduce air into the first chamber A, an enlargement 12 is formed in the casing 4 the chamber so formed connected by a pipe 13 to a suitable source of supply such as a blower A as shown in Fig. 2 when air above atmospheric pressure is employed. The air entering into this chamber 12 will pass through the perforations in the periphery of the shell and passages 17 into the interior of the latter and then pass through the charge consisting of balls and material to be reduced, out through other passages 17 and perforations in the shell into a channel 14 formed by an enlargement of the casing 4 and extending longitudinally of the casing beyond the partition 11. From this channel the air will pass through the perforations in the shell and passages 17 and through the charge and escape from the chamber B into a chamber 18 formed by an enlargement of the casing and be conducted by the pipe 19 to the place of storage or use. In its passage through the charge in the chamber A the current will pick up fine material, the maximum size of the material so picked up being dependent upon the rate of flow of the air through the chamber and charge. The material thus picked up is carried into the charge of the chamber B and as the rate of flow of the current has been retarded in its passage through the charge in chamber A, it will withdraw from the charge in the chamber B material suitably reduced in size from that carried into the charge in the chamber B. In case a current of air coming from the chamber A will not have a sufficient rate to pick up as large particles as desired to be removed from the charge in the chamber B, an auxiliary current of air may be introduced into the channel 14 by means of a branch pipe 20 provided with a regulating valve 21.

Figure 5:
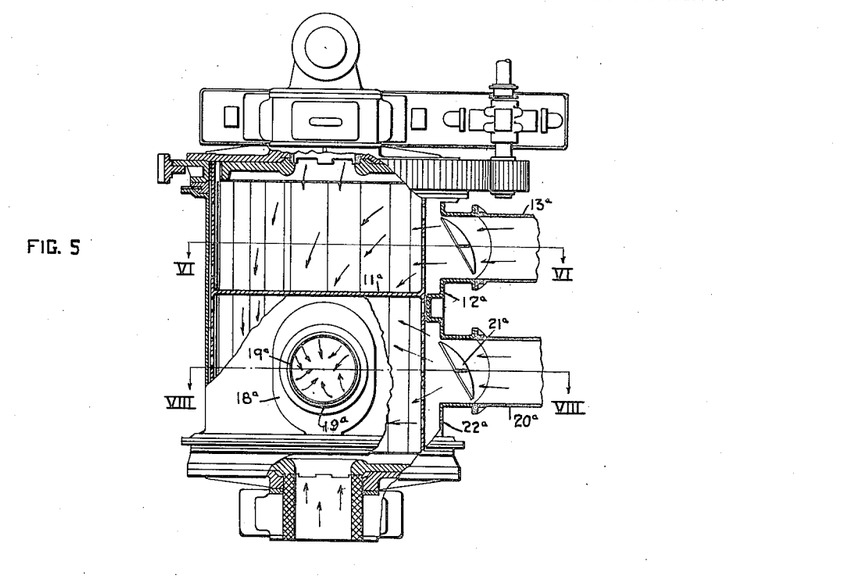
Figs. 5, 6, 7, and 8 are views similar to Figs. 1 to 4 respectively and illustrate a modification; a further modification is shown in Figs. 9, 10, and 11, Fig. 9 being a sectional plan and Figs. 10 and 11 sectional elevations on planes indicated respectively by the lines X—X and XI—XI, Fig. 9; another modification is shown in Figs. 12 to 15, Fig. 12 being a top plan.
Figure 6:
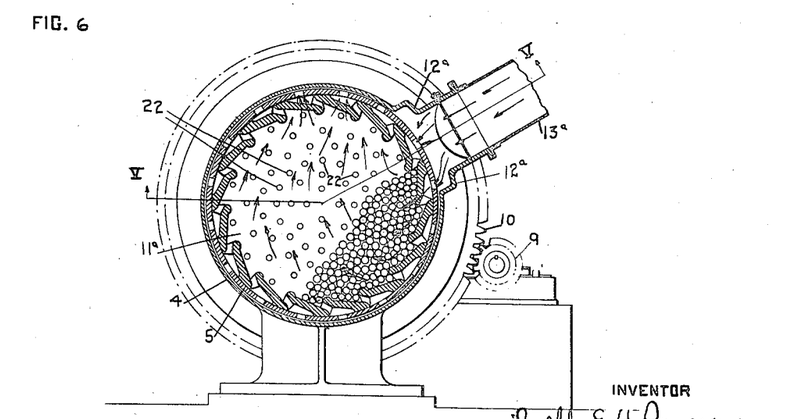

As will be readily understood by those skilled in the art, the size of the material which will be carried from the charge in chamber A in the construction shown in Figs. 1 to 4, into the connecting passage by the current of air through the charge, will necessarily be quite fine and when it is desired to transfer coarser particles without unduly increasing the rate of flow of air, the latter may be so introduced into chamber A that it will pass through the periphery of the shell through the charge into the chamber at a point where the charge begins to loosen up or near the upper portion of its movement within the shell. In such case, the inlet chamber 12$^a$ is located at a point in the casing in line or nearly in line with the upper limit of the movement of the charge by the rotation of the drum. When the air is so introduced as shown in Figs. 5 and 6, it is preferred that the movement of the air carrying the material from chamber A should pass through perforations 22 in the diaphragm 11$^a$ into the drum B. The air thus entering the chamber B will sweep along the surfaces of the charge depositing the heavier material and then escaping through the outlet chamber 18$^a$ and pipe 19$^a$. As is well known, pulverized material, especially coal, will flow nearly as readily as water and in a construction employing the perforated diaphragm the large percentage of the material when reduced to a suitable fineness, will flow through the perforations, such movement into the chamber B being in addition to that carried into the latter by the current of air. In order to remove the pulverized material from the charge in chamber B an additional current of air is employed and is directed through the perforations in the charge into chamber B. This additional air is introduced through a pipe 20$^a$ into chamber 22$^a$ formed by an enlargement of the casing, the flow of air being controlled by a damper 21$^a$.

Figure 9:
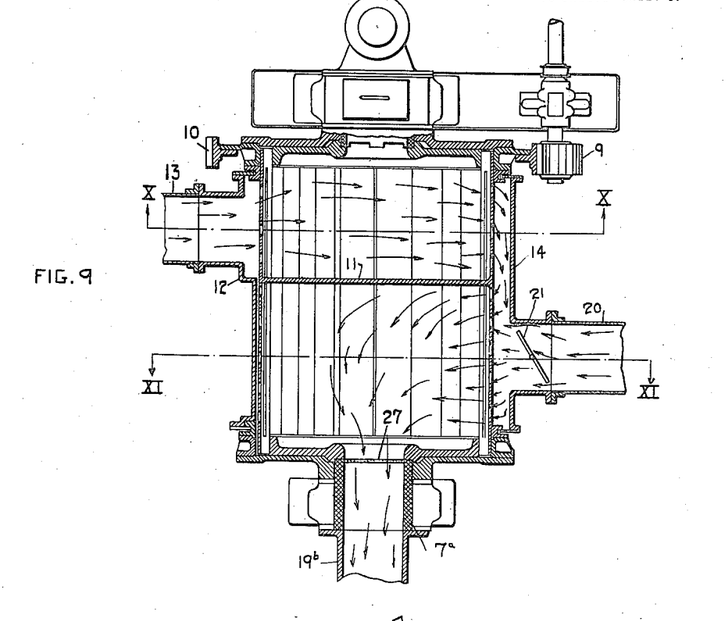
Figure 10:
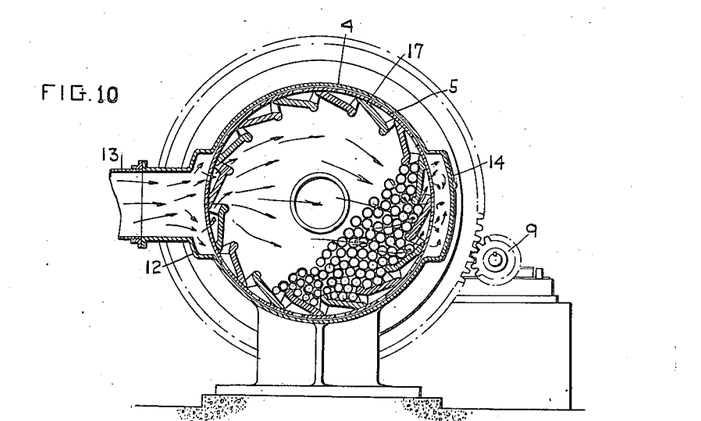
Figure 11:
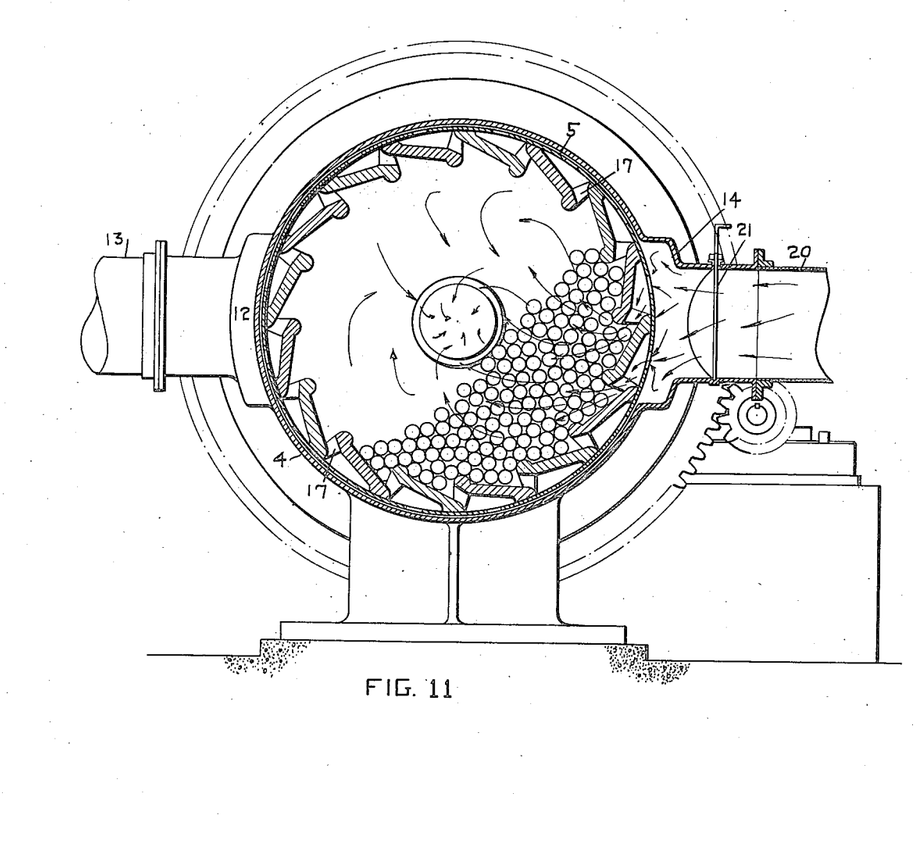
Figure 12:
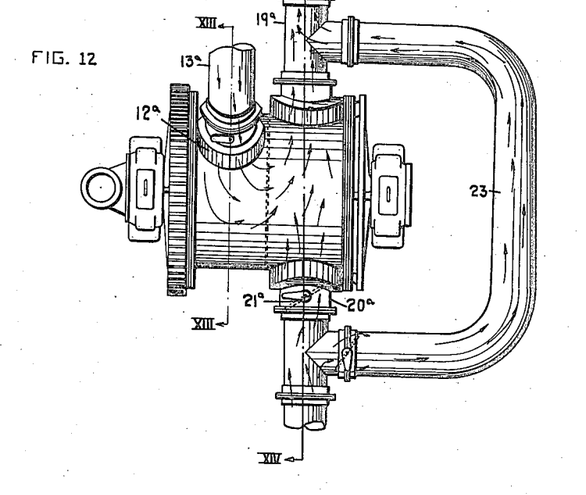
Figure 13:
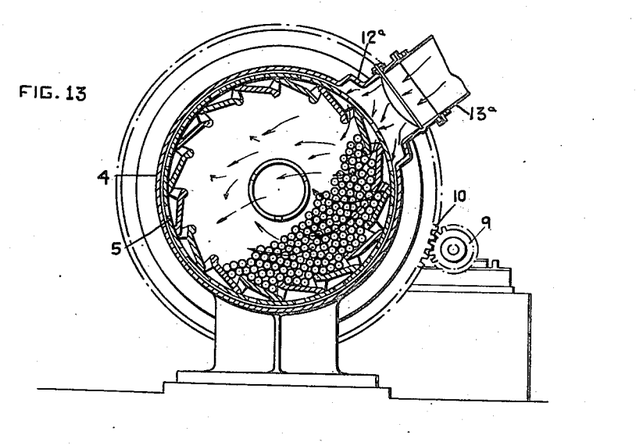
Figs. 13 and 14 sectional elevations on planes indicated respectively by lines XIII—XIII and XIV—XIV, Fig. 12.
Figure 14:
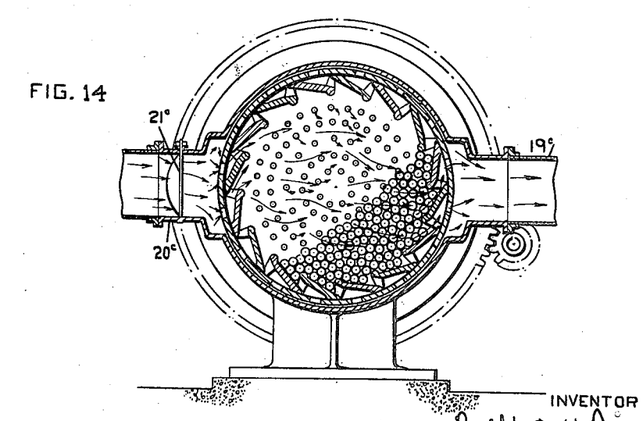
Figure 15:
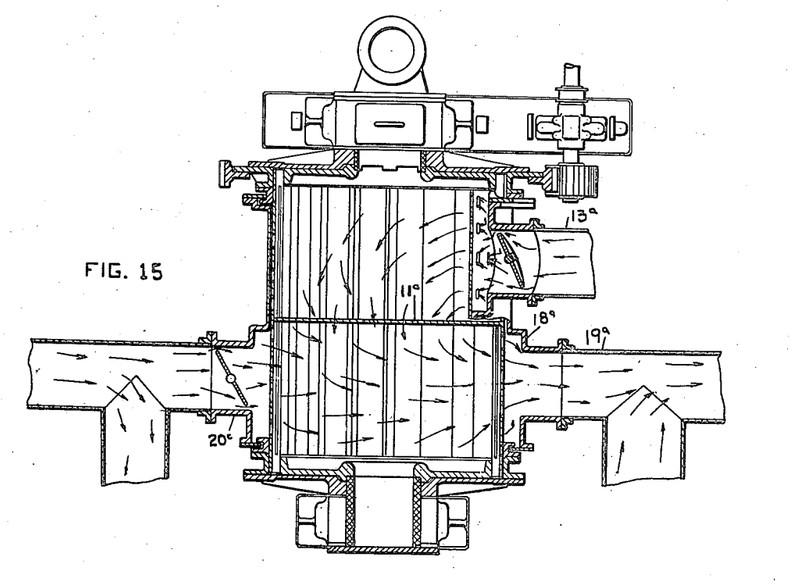
Fig. 15 is a sectional plan view.

In the construction shown in Figs. 9 to 11 inclusive, the manner of introducing the air into chamber A and conducting it into chamber B, and also the employment of additional air when necessary, is substantially similar to that employed in the construction shown in Figs. 1 to 4 inclusive, but in lieu of providing a peripheral outlet for the air from the chamber B the trunnion 7$^a$ adjacent to the chamber B and communicating therewith, is formed hollow permitting the escape of air to the pipe 19$^b$ which will conduct it to a point of use or storage.

As at times the air escaping from the chamber B and laden with pulverized fuel may not have a sufficiently high rate of flow to carry such material to the point of combustion or storage, and in order to obviate an increase in the rate of flow of air through the chamber B as will be necessary for such transfer, a by-pass 23 is formed connecting the inlet pipe 20 for the additional air with the outlet pipe 19$^c$ as shown in Figs. 12 to 15 inclusive. While the arrangement shown in Figs. 12 to 13 for introducing the air into chamber A and thence to chamber B through perforations in the diaphragm 11$^c$ is substantially similar to that shown and described in Figs. 5 to 8 inclusive, it will be understood that a by-pass can be arranged in connection with the different forms or modifications shown herein.

Figure 16:
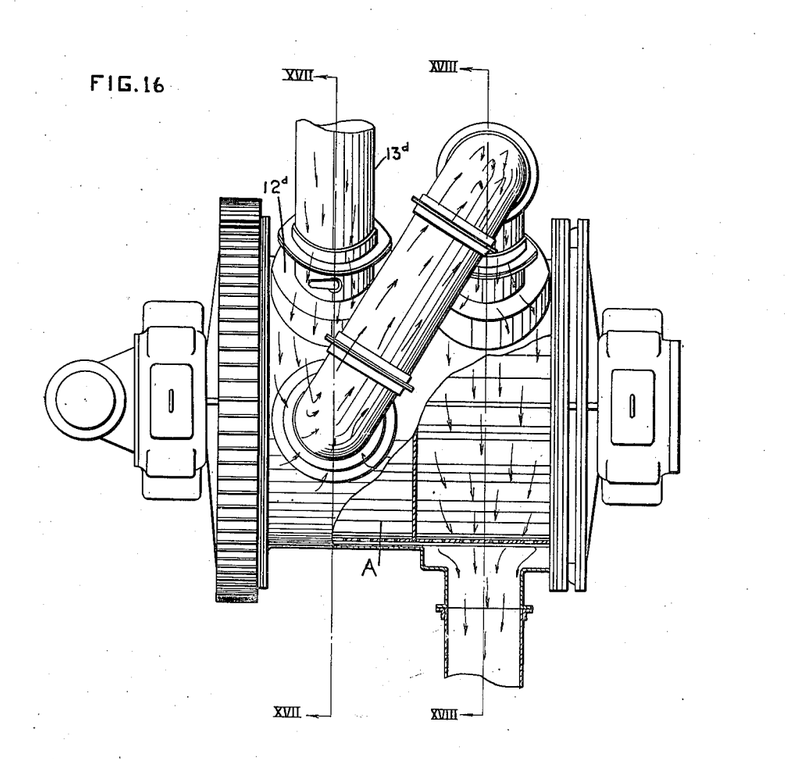
Fig. 16 is a top plan view of a method of directing the air currents through the chamber of the pulverizing apparatus and Figs. 17 and 18 are sectional elevations, the plane of section being indicated respectively by the lines XVII—XVII and XVIII—XVIII, Fig. 16.
Figure 17:
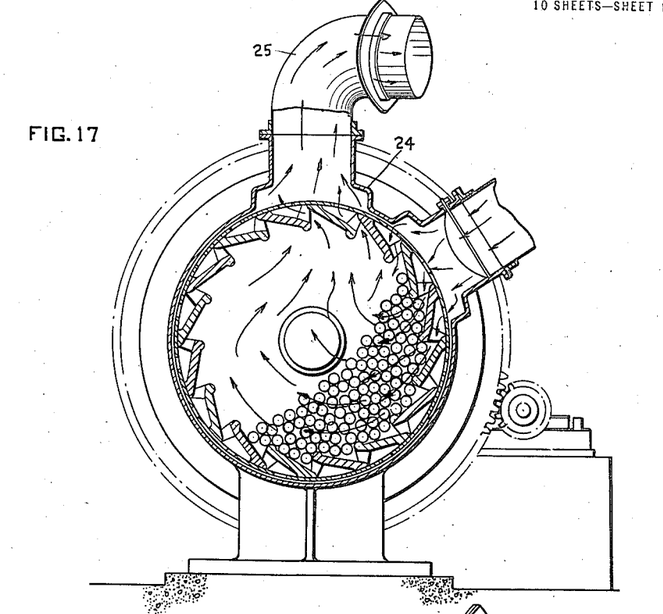
Figure 18:
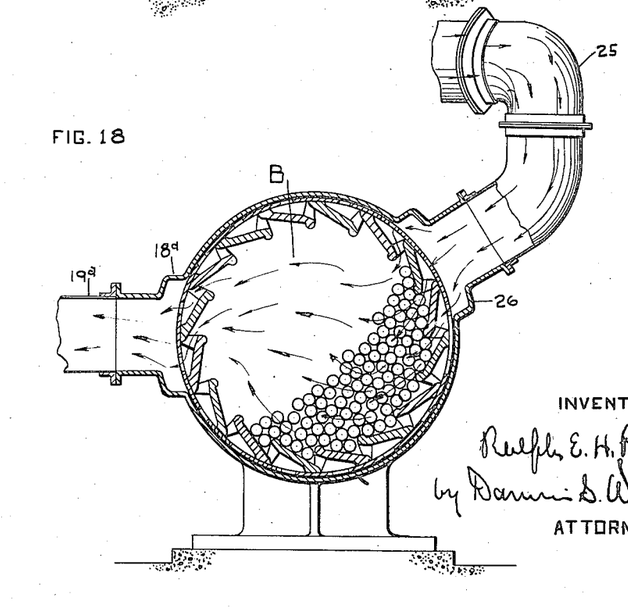

In the construction shown in Figs. 1 to 15 inclusive, the air current in one or the other of the chambers A—B will pass from the chamber outwardly through the charge and through the perforations in the shell. Where the air passes from the chamber out through the charge the latter will have a screening effect and the compactness of the charge may require a higher pressure than is desired. In order to overcome this difficulty provision is made as shown in Figs. 16 to 18 inclusive, for causing the air in each of the chambers to pass inwardly through the perforations in the shell and through the charge into the chamber. In the construction shown in these figures, the air is admitted through the pipe 13$^d$ and chamber 12$^d$ into the chamber A and will, as shown, pass through the charge into the chamber and escape therefrom through a chamber 24 formed by enlargement of the casing 5; pipe 25 which has its opposite end connected to a chamber 26 also formed by an enlargement of the casing preferably so located that the air passes through this pipe, will pass through the charge in chamber B adjacent to the upper portion of the charge or where the charge begins to loosen up. The air will escape from the chamber B through chamber 18$^d$ and pipe 19$^d$. As hereinbefore stated, where the air passes through the charge in flowing from chamber B the latter will have a screening effect and prevent the removal of the coarse or too large particles of material, but in cases where air enters the chamber B through the portion of the charge where it begins to loosen up, too coarse particles may at times be carried from the charge and in order to prevent such coarse particles being carried out of the chamber a screen of suitable mesh may be employed. Such an arrangement is shown in Fig. 9 wherein a screen 27 is arranged in the hollow trunnion 7ª.

Figures 7, 8:
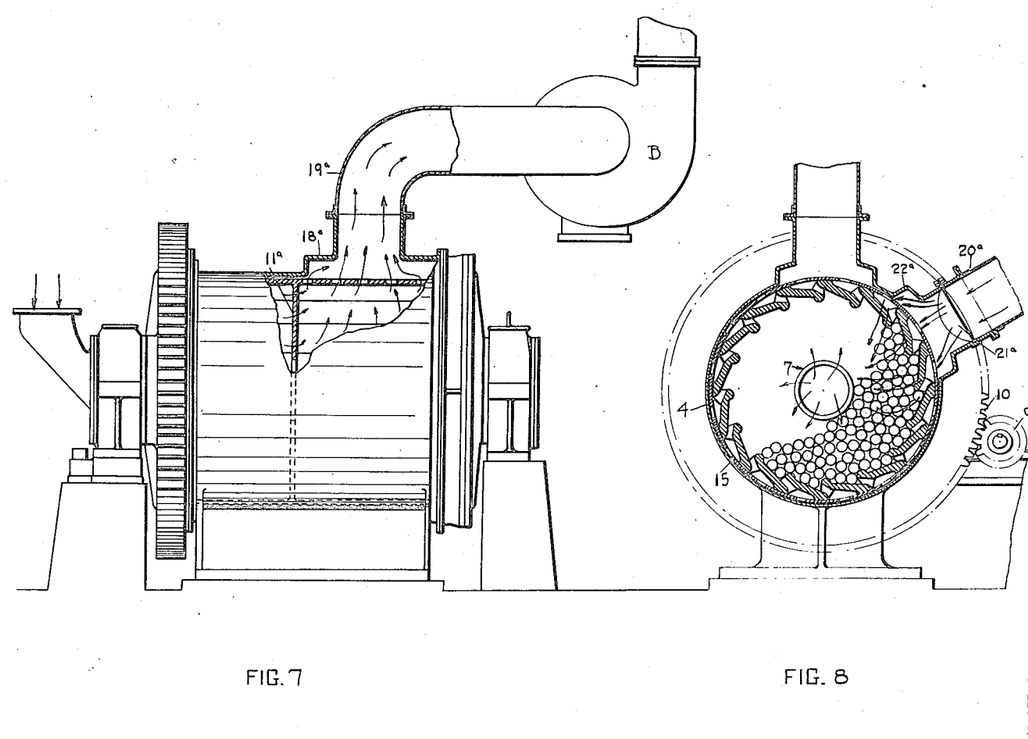

It is desirable in the operation of the pulverizer of the type described and shown herein that all portions of the several chambers should be swept by currents of air to prevent a deposit of the pulverized material therein and the air, it will be understood, should enter at different points in order that it may reach all portions of the chambers, and hence it may be desirable to admit air through the one or both of the trunnions as shown in the drawings. It will be understood by those skilled in the art that the air may be caused to flow through the several parts of the apparatus as described either by attaching the outlet from the final chamber to a vacuum apparatus such as an exhaust fan B as shown in Fig. 7, or air at a pressure higher than atmospheric may be supplied through the inlet pipe of the first chamber of the series by a suitable form of blower as shown at A in Fig. 2.

It will be understood that although the term "balls" is employed herein, that durable bodies known in the art, such as pipes, rods, cobble stones, etc., may be employed and that the term "balls" is used generically herein as covering any such known device.

I claim herein as my invention:

1. An apparatus for reducing frangible material having in combination a plurality of rotatable chambers each having a mass of independently movable pieces of hard material therein, means for feeding material to be reduced into the first chamber, means for directing currents of air through the charge in the first chamber, means for directing the air escaping from the first chamber through the mass in a succeeding chamber and means for directing auxiliary currents of air through the charge in the succeeding chamber.

2. An apparatus for pulverizing material having in combination a rotatable shell having perforations in its periphery and provided with chambers or compartments, a casing surrounding said shell, masses of independently movable pieces of hard material in said chambers, means for feeding material into one of said chambers, means for feeding air through the casing into the chamber into which the material is introduced, means for permitting the flow of air to another chamber after having passed through the charge therein, and an outlet in the casing for the escape of air from the second chamber, the points of entrance of the air into the second chamber and its escape therefrom being so arranged with reference to the charge therein that the air will pass through the charge before escaping from the chamber.

3. An apparatus for pulverizing material having in combination a rotatable shell having perforations in its periphery and provided with a plurality of chambers or compartments, a casing surrounding said shell, masses of balls in said chambers, said casing having ports or openings for the entrance of and escape of air through the peripheries of the several chambers, one of the ports of one chamber being connected to a port in a succeeding chamber.

4. An apparatus for pulverizing material having in combination a rotatable shell having perforations in its periphery and provided with a plurality of chambers or compartments, a casing surrounding said shell and provided with ports or openings for the entrance and escape of air through the peripheries of the several chambers, a connection for the outlet of one chamber to the inlet of a succeeding chamber, and a valved connection to the inlet of the succeeding chamber for the admission of additional air into the said chamber.

5. An apparatus for pulverizing material having in combination a rotatable shell having perforations in its periphery, a perforated diaphragm dividing the shell longitudinally into independent chambers, a port in the portion of the casing surrounding the first chamber permitting the flow of air through the perforations in the shell into said chamber and ports in the portion of the casing surrounding the second chamber permitting the flow of air through the shell into and out of the second chamber.

6. In an apparatus for pulverizing material the combination of a rotatable shell having hollow trunnions and having perforations in its periphery, a casing surrounding the shell, a perforated diaphragm dividing the shell longitudinally, said casing having a port or opening in the portion surrounding the chamber into which the material to be reduced is fed, permitting of the inflow of air through the periphery of the chamber and a port or opening in the portion thereof surrounding the second chamber permitting of the flow of air inwardly through the periphery of said chamber.

7. In an apparatus for pulverizing material the combination of a rotatable shell having hollow trunnions and having perforations in its periphery, a casing surrounding the shell, a perforated diaphragm dividing the shell longitudinally, said casing having a port or opening in the portion surrounding the chamber into which the material to be reduced is fed, permitting the inflow of air through the periphery of the chamber and a port or opening in the portion thereof surrounding the second chamber permitting the flow of air inwardly through the periphery of said chamber, and a screen arranged in the trunnion forming the discharge from the second trunnion.

In testimony whereof, I have hereunto set my hand.

RALPH E. H. POMEROY.